US006311564B1

(12) United States Patent
Martin et al.

(10) Patent No.: US 6,311,564 B1
(45) Date of Patent: Nov. 6, 2001

(54) SUPPORT APPARATUS WITH STRESS MEASURING CAPABILITY

(75) Inventors: Lewis Allen Martin; Richard P. Curtin, both of Nine Mile Falls, WA (US)

(73) Assignee: The United States of America as represented by the Department of Health and Human Services, Washington, DC (US)

( * ) Notice: Subject to any disclaimer, the term of this patent is extended or adjusted under 35 U.S.C. 154(b) by 0 days.

(21) Appl. No.: 09/601,714

(22) PCT Filed: Feb. 25, 1999

(86) PCT No.: PCT/US99/04201

§ 371 Date: Sep. 7, 2000

§ 102(e) Date: Sep. 7, 2000

(87) PCT Pub. No.: WO99/44025

PCT Pub. Date: Sep. 2, 1999

Related U.S. Application Data

(60) Provisional application No. 60/076,138, filed on Feb. 27, 1998.

(51) Int. Cl.[7] .................................................. G01P 1/00
(52) U.S. Cl. ........................................................... 73/787
(58) Field of Search ...................... 73/862.391, 862.473, 73/862.474, 862.393, 862.621, 862.627, 786, 795, 787

(56) References Cited

U.S. PATENT DOCUMENTS 3,894,427 * 7/1975 Schuermann et al. ................. 73/781
3,958,455   5/1976 Russell .
4,388,710   6/1983 Pecon, Jr. .

(List continued on next page.)

FOREIGN PATENT DOCUMENTS 0867 687 A1   9/1998 (EP) .
9005180       1/1997 (JP) .

OTHER PUBLICATIONS

De Vries, Marten J.; et al., Abstract of "Optical Fiber Sensors for Monitoring Strain on Rebar–Type and Cable–Type Bolts," *Society of Photo–Optical Instrumentation Engineers*, 236–241, (1995).

Choquet, P. Abstract of "Improvement of a spiral strain gauge to monitor load and strains on cable bolts used as ground support," *Geotechnical Instrumentation and monitoring in open pit and underground mining*, 91–100, (1993).

Hyett A. & Bawden, W., Back to Basics—Practical Uses of Technology, *13th Mine Operators' Conference*, Sundbury '07, Miller Publishing, 19 pages.

Fraden, Jacob, *AIP Handbook of Modern Sensors, Physics, Designs and Applications*, pp. 361–262.

Instrument King Wire for Monitoring Cable Bolts for Use With Resin Grouting CDC#–023–97/0 Prepared for Centers for Disease Control, 9 pages (Jul. 11, 1997).

*Primary Examiner*—Max Noori

(57) ABSTRACT

Apparatus for providing support to, and/or measuring the stress present in a potentially unstable structure, such as the roof of a coal or other underground mine, or a rock mass. The apparatus is an instrumented cable that has a center wire having a plurality of stress measuring devices attached along its length. Forming material is placed around the center wire and the stress measuring devices in order to provide protection and support. A plurality of noncenter wires extend generally longitudinally around the center wire, the stress measuring devices, and the forming material. Advantageously, the apparatus measures the stress placed thereon when inserted into the potentially unstable structure at more than one location along the length thereof, may be spun into a rock mass without damaging the stress measuring devices (or other components of the apparatus) and may be grouted into the potentially unstable structure with a variety of different grouts.

37 Claims, 8 Drawing Sheets

U.S. PATENT DOCUMENTS

| | | |
|---|---|---|
| 4,402,229 | 9/1983 | Byrne . |
| 4,803,888 | 2/1989 | Choquet . |
| 4,833,927 | 5/1989 | Park . |
| 4,962,668 * | 10/1990 | Preston et al. .......................... 73/784 |
| 5,086,651 * | 2/1992 | Westermo et al. ..................... 73/763 |
| 5,253,960 | 10/1993 | Scott . |
| 5,284,107 | 2/1994 | Milne et al. . |
| 5,381,690 | 1/1995 | Kanduth et al. . |
| 5,425,601 | 6/1995 | Calandra et al. . |
| 5,542,788 | 8/1996 | Stankus et al. . |
| 5,586,839 | 12/1996 | Gillespie . |
| 5,929,341 | 7/1999 | Bawden et al. . |

* cited by examiner

SUPPORT APPARATUS WITH STRESS MEASURING CAPABILITY

This Appln is a 371 of PCT/US99/04201 filed Feb. 25, 1999, which claims benefit of Provisional No. 60/076,138 filed Feb. 27, 1998.

BACKGROUND OF THE INVENTION

1. Field of the Invention

The invention relates generally to an apparatus for providing support to a potentially unstable structure, such as a rock mass or the roof of a coal or other underground mine, and/or for measuring the stress, strain and/or tension load placed on the apparatus when inserted into the potentially unstable structure.

2. Background and Description of Related Art

Cables are strong wire ropes which are used in coal and other mining operations in locations in which safe access may not be guaranteed during mining to support the roof of the mine from the surface. Most cables employed in mining operations are made by winding approximately six to eight small wire cables around a center wire cable, which is called a "kingwire." Typical steel cables generally have a diameter ranging between about 10 and 40 millimeters, generally have a length ranging between about 5 and 50 meters, and are generally used in boreholes with a diameter between about 45 and 90 millimeters. Steel cables are installed in holes drilled or bored into the rock present in the roof of the mine (boreholes, and bonded to the rock with grout, to reinforce the rock mass. The grout, which is usually a cement grout, a cement mortar, or a chemical grout, is pumped into the borehole after the cable has been pushed into the borehole.

A large amount of stress is generally placed upon cables used for support in mining operations, and upon the cable bolts which are used to secure these cables to the rock mass. The measuring of such stress on the cables and cable bolts is important for risk management, so that the risk of partial or complete collapse of the roof of the mine, and the resulting injury or death to mine workers is minimized or preferably eliminated.

"Stress" is an intangible quantity which cannot be measured directly. It is only the manifestation of stress which is measured in, for example, pounds per square inch (psi), and is used to estimate the stress. In most mining and civil engineering applications, strain measuring devices are installed in a borehole. "Strain" is the displacement of a cable as the cable moves a linear distance (generally measured in microinches ($10^{-3}$ inch)). "Tension" and "load" are the amount of force placed upon the cable in, for example, pounds per foot (lbf), and may place a strain on the cable.

The monitoring of the roof support (by monitoring the stress placed on the cables and cable bolts when inserted into the roof of a mine) has become of increasing importance as deeper mines and higher productivity requirements have led to more mechanization, and to larger excavations. This has resulted in increasing rates of mining-induced stress. As soon as an excavation has been made, the rock surrounding the excavation begins to move and dilate into the new void. While the dilation cannot be stopped, it can be controlled by measuring the amounts and directions of stresses placed upon the cables and cable bolts inserted into the rock. Because cables and cable bolts are a passive reinforcement system in the rock mass, the load which is measured along the cable develops in response to deformation in the rock mass. Monitoring and warning devices have been developed to warn of relative movement between the rock mass and support members for various support types.

Most of the devices for measuring stress or strain on cables and/or cable bolts inserted into unstable structures, such as those described in U.S. Pat. Nos. 4,388,710, 4,803,888 and 5,284,107, are external devices which are positioned on the outside of the cables.

Hyett, "Development of a New Instrumented Cable Bolt to Monitor Ground Support Loads in Underground Excavations," 13th Mine Operators' Conference, Queen's University, Canada, Sudbury (1977), describes an instrumented cable using Stretch Measurement to Access Reinforcement Tension (SMART) technology. The SMART technology involves fabricating a miniature Multi-Point Borehole Extensometer (MPBX) within a tempered stainless steel tube which replaces the kingwire of a 7-wire strand cable. The displacement of six spring-loaded wires caused by stretch (elongation) of the cable occurs, and applied force or load is measured (in kN) using linear potentiometers, rather than strain gauge technology. Disadvantageously, and unlike the apparatus of the present invention, due to the fragility of the potentiometers, these instrumented cables cannot be spun into a rock mass without severely damaging or destroying the potentiometers. Rather, the cables must be hand-laid into the rock mass, which is time-consuming and labor intensive, and can only be used with concrete (cement) grout.

DeVries et al., "Optical Fiber Sensors for Monitoring Strain on Rebar-Type and Cable-Type Bolts," Proceedings of SPIE—The International Society For Optical Engineering 2446: 236–241 (1995), describes the use of short, gage-length optical fiber sensors (mirror and light reflectivity sensors) which are surface mounted, using an epoxy resin adhesive, inside of a small groove of the kingwire of a 7-strand cable, for the measurement of relative strain in rebar-type and cable-type bolts used in the mining industry to support unstable material, or to keep rock masses together. Disadvantageously, and unlike the apparatus of the present invention, the apparatus described by DeVries et al. only measures strain at one location, rather than at more than one location, on the cable. Further, because optical fiber sensors are quite bulky, it is not possible to win a series of cables around a kingwire having these optical fiber sensors attached thereto.

There is a need for an improved apparatus for measuring the stress placed upon a cable or other support inserted into an unstable structure, such as the roof of a mine, which overcomes the difficulties of the prior art.

The present invention provides an improved apparatus for providing support to an unstable structure, and for measuring the stress placed upon the apparatus, when inserted into the unstable structure to determine whether or not the unstable structure is being subjected to mining-induced stress changes, or to stress changes caused by other factors. The apparatus of the invention measures the value of tension, strain and stress placed thereon at various locations along the length of the apparatus in, for example, areas of reduced clearance, such as boreholes present in a potentially unstable rock mass. The apparatus advantageously measures stress placed thereon at more than one location along the length of the apparatus (at multiple locations), and is sufficiently durable that it can be spun into a rock mass (or other structure) without damaging its components. Thus, the present invention need not be hand-laid. Further, the apparatus can be bonded into the rock mass (or other structure) with a variety of different types of grout, such as cement-based grouts and resin-based grouts. Moreover, because stress measuring devices are present inside, rather than on the outside, of the apparatus, the results produced by these stress measuring devices are less susceptible to environmental conditions, which can adversely affect resistance wire instruments. The apparatus of the invention may be quickly and efficiently installed into rock masses and other potentially unstable structures using routine procedures, and provides a means for improving the reliability of roof support systems in deep mine and other applications.

Additional advantages of the invention are set forth hereinbelow and are shown in the accompanying drawings.

SUMMARY OF THE INVENTION

The present invention provides an apparatus for providing support to a structure, and for measuring stress placed on the apparatus when present in the structure, said apparatus comprising:
- (a) a center wire, the center wire having a length which is greater then its width;
- (b) a plurality of stress measuring devices, the stress measuring devices being attached along the length of the center wire for measuring stress present on the apparatus;
- (c) a forming material, the forming material being formed around the center wire and the stress measuring devices;
- (d) a plurality of noncenter wires, each noncenter wire having a length which is greater than its width, and being wound around the length of the center wire, the stress measuring devices and the forming material; and
- (e) a device for collecting data produced by the stress measuring devices, the device being connected with the stress measuring devices;

wherein the stress placed on the apparatus can be measured at more than one location along the length of the apparatus, and wherein the apparatus is spinnable into a rock mass without damaging the stress measuring devices.

The present invention also provides a method for supporting a structure and measuring strain within said structure, said method comprising:
- (1) drilling a hole in said structure;
- (2) placing an apparatus within said hole; and
- (3) bonding said apparatus within said hole to said structure;

wherein said apparatus comprises:
- (a) a center wire, said center wire having a length which is greater than its width;
- (b) a plurality of stress measuring devices, said stress measuring devices being attached along the length of said center wire for measuring stress present on said apparatus;
- (c) a forming material, said forming material being formed around said center wire and said stress measuring devices;
- (d) a plurality of noncenter wires, each noncenter wire having a length which is greater than its width, and being wound around the length of said center wire, said stress measuring devices, and said forming material; and
- (e) a device for collecting data produced by said stress measuring devices, said device being connected with said stress measuring devices;

wherein the stress placed on said apparatus can be measured at more than one location along the length of said apparatus, and wherein said apparatus is spinnable into a rock mass without damaging said stress measuring devices.

Additional features of the invention are set forth below, and are shown in the accompanying drawings.

BRIEF DESCRIPTION OF THE DRAWINGS

FIG. 1 shows various components of the apparatus of the invention in different stages of production.

In FIG. 5, ♦ represents strain gauge number 1, ■ represents strain gauge number 2, ▲ represents strain gauge number 3, X represents strain gauge number 4, ★ represents strain gauge number 5, ● represents strain gauge number 6, + represents strain gauge number 7, − represents strain gauge number 8, - - represents strain gauge number 9, and ● represents strain gauge number 10.

In FIG. 6, ♦ represents average set number 1, ■ represents average set number 2, ▲ represents average set number 3, X represents average set number 4 and ★ represents average set number 5.

DETAILED DESCRIPTION OF THE PREFERRED EMBODIMENTS

Figure 1A:
FIG. 1a shows a center wire having five stress measuring devices attached thereto.
Figure 1B:
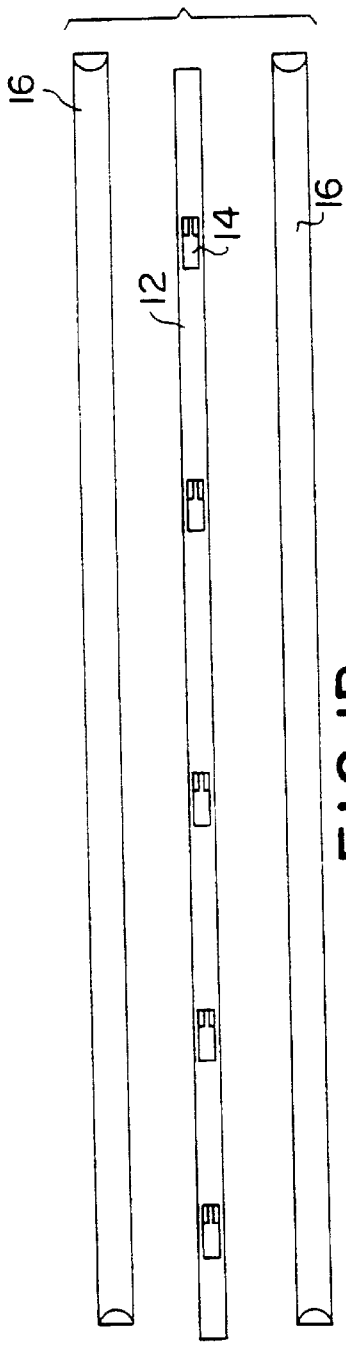
FIG. 1b shows the same center wire with forming material about to be placed around the center wire.
Figure 1C:
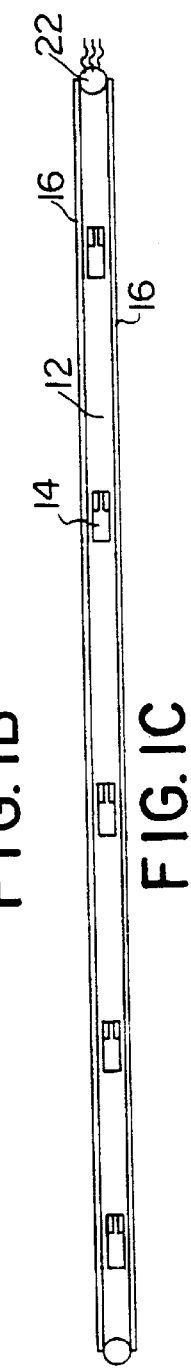
FIG. 1c shows the same center wire with the forming material molded around the center wire and with a connecting device attached thereto.
Figure 1D:
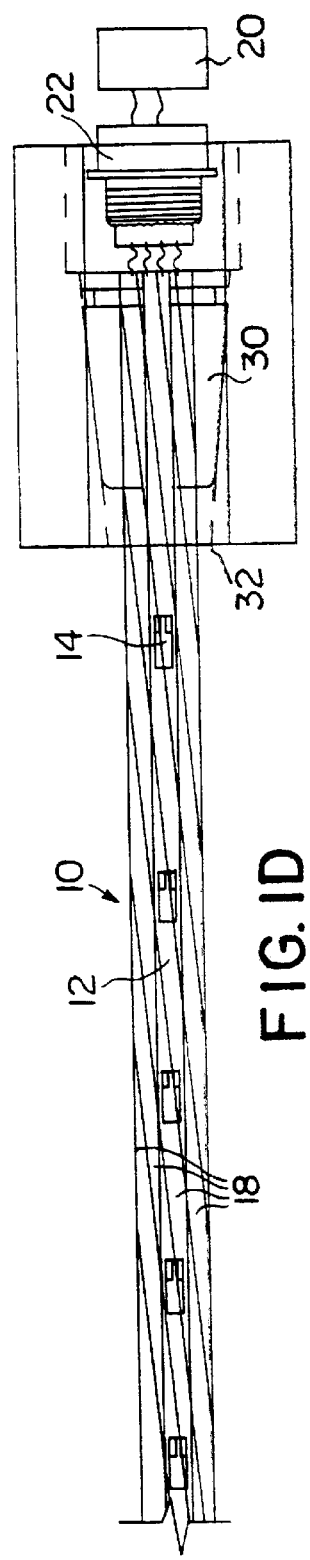
FIG. 1d shows a perspective view of the completed apparatus.
Figure 2:
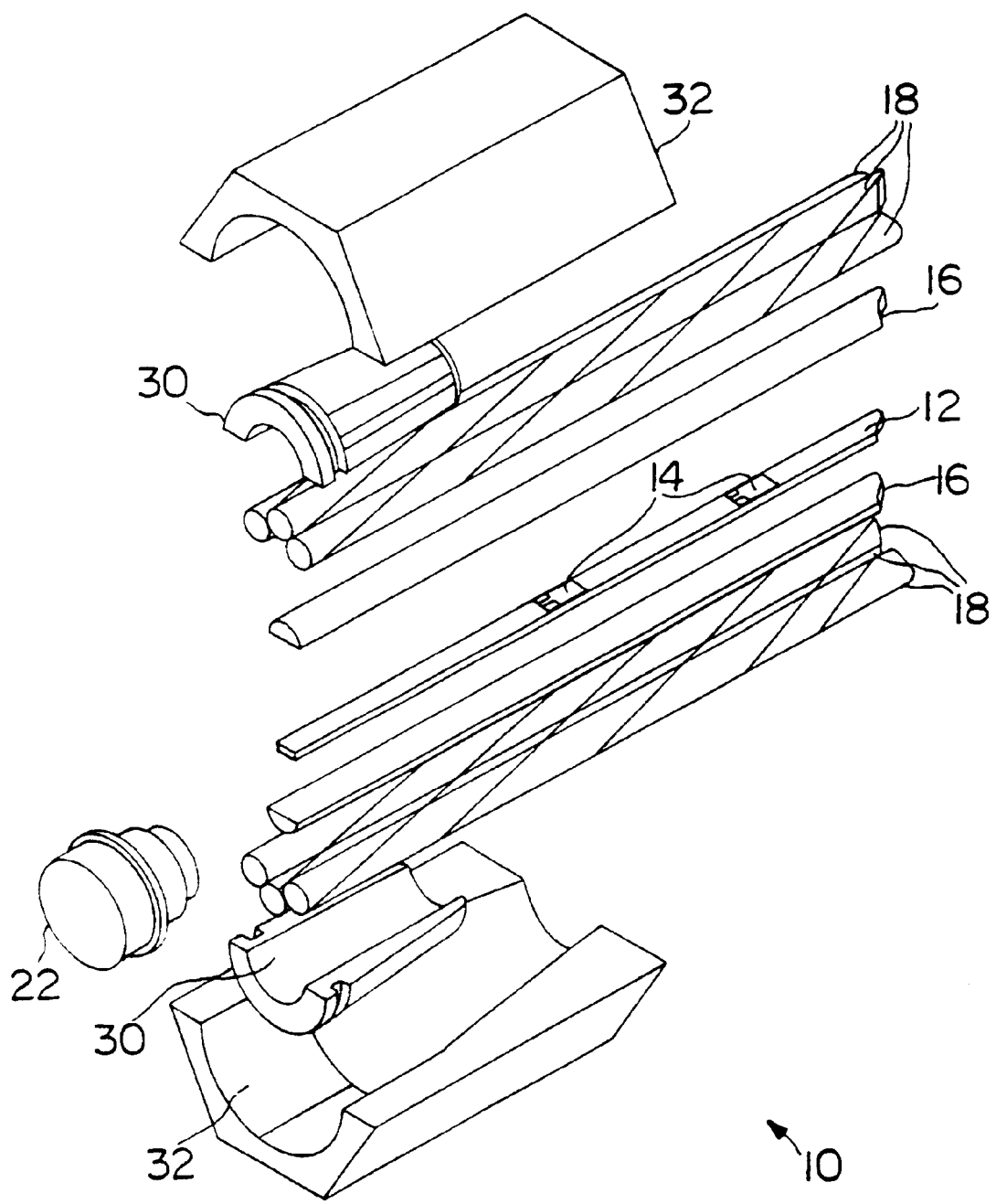
FIG. 2 and FIG. 3 each show various components of the apparatus of the invention.
Figure 3:
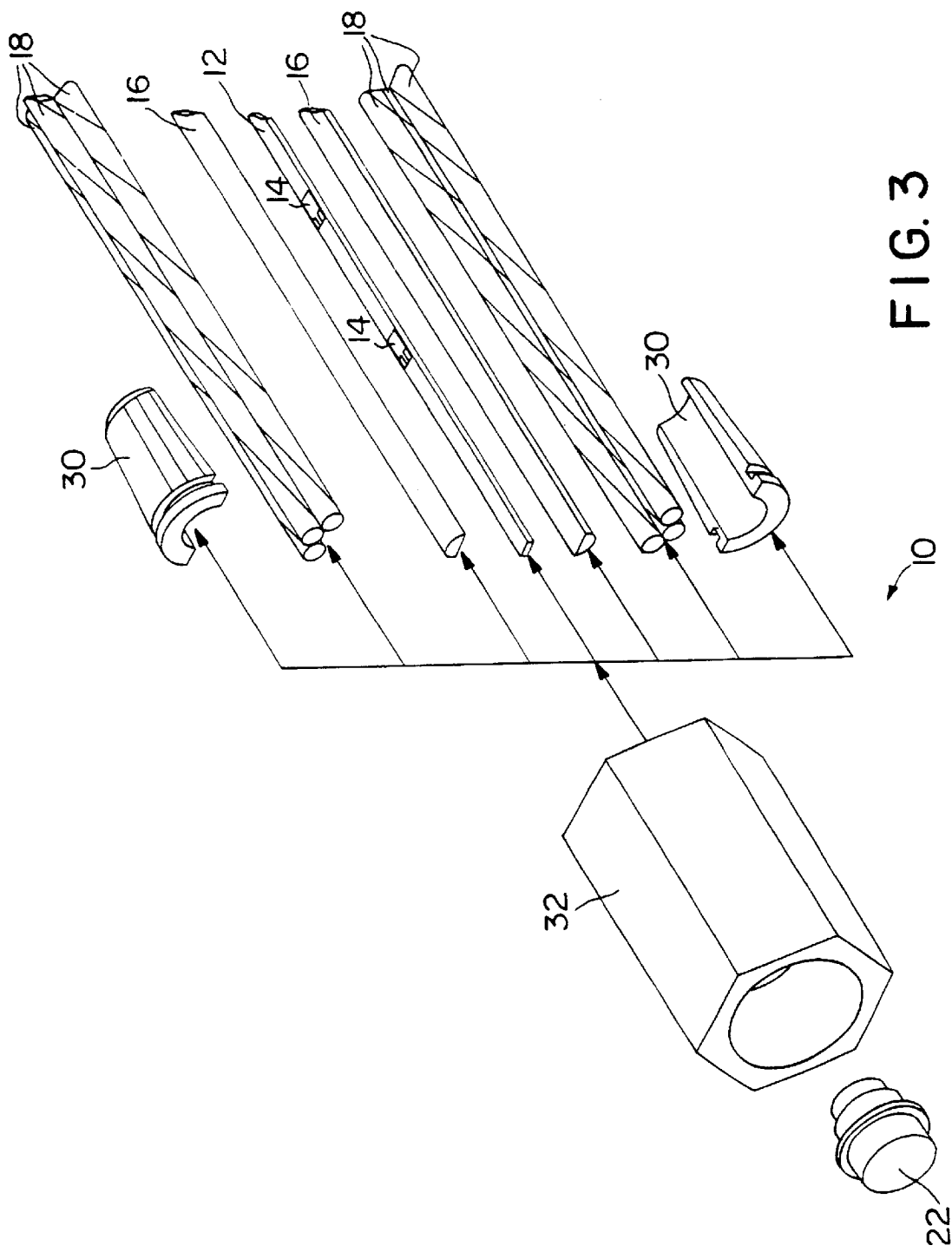

The present invention provides an apparatus for providing support to, and/or measuring the stress present in, an unstable structure. By measuring the stress placed at more than one location along the length of the apparatus when inserted into a potentially unstable structure, the apparatus also measures the stress present in the structure and, thus, provides a warning of a potentially hazardous situation. The present invention is not limited to the precise arrangements, configurations, dimensions, and/or instrumentalities shown in the drawings, or described herein.

Preferred embodiments of the apparatus of the invention will now be described with reference to the drawings. In the drawings, like reference symbols indicate the same parts of the apparatus throughout the different views thereof.

The apparatus illustrated in the accompanying figures generally comprises an apparatus 10 for measuring the stress in an unstable structure, such as a rock mass, the roof of a coal or other mine, a concrete span for a bridge, a retaining wall near a highway, a railroad or highway tunnel, a road cut, a trench, or a natural slope near a construction area, and for measuring the stress, strain, and/or tension present along the length of the apparatus. The apparatus 10 can be used to provide support to, and measure the stress present in, any structure in need of such support or stress measurement, many of which exist in the construction industry.

The illustrated apparatus 10 comprises a center wire 12, a plurality of stress measuring devices 14 attached along the length of the center wire 12, a forming material 16 formed around the center wire 12 and the stress measuring devices 14, a plurality of noncenter wires 18 around the length of the center wire 12, the stress measuring devices 14 and the forming material 16, and a device for collecting data 20 produced by the stress measuring devices 14.

The apparatus 10 generally has a diameter which ranges from about 0.4 to about 2 inches, which preferably ranges from about 0.598 to about 0.602 inches, with about 0.600 inches being most preferred. The apparatus 10 has a length which generally ranges from about 1 to about 10,000 feet, which preferably ranges from about 3 to about 1,000 feet, and which more preferably ranges from about 5 to about 100 feet, with about 10 to 25 feet being most preferred. Of course, as those skilled in the art will realize, dimensions larger or smaller than those give here (or elsewhere in the specification) may be used, and even preferred, in particular applications. The center wire 12 is preferably a strip of material which functions as a kingwire in a cable, and which has a plurality of stress measuring devices 14 attached along the length of the strip, preferably on both sides thereof. The center wire 12 generally has a length which is greater than its width. The width of the center wire 12 will generally range from about 0.05 to about 0.5 inches, and preferably ranges from about 0.08975 to about 0.09775 inches, and more preferably ranges from about 0.09175 to about 0.09575 inches, with about 0.09375 inches being most preferred. The length of the center wire 12 will generally be the same as the length of the apparatus 10, as is described hereinabove. The thickness of the center wire 12 generally ranges from about 0.02725 to about 0.03525 inches, and preferably ranges from about 0.02925 to about 0.03325 inches, with about 0.03123 to about 0.03125 inches being most preferred.

The center wire 12 may be made from any material to which the stress measuring device 14 may be attached and, in conjunction with the forming material 16 and plurality of noncenter wires 18 placed therearound, is durable enough to withstand the loads which will be placed thereon. For example, the center wire 12 may be made from steel, with type 1020 cold roll steel being preferred.

A plurality of stress measuring devices 14 are attached along the length of the center wire 12, preferably with about one-half of the stress measuring devices 14 being attached along the length of one side of the center wire 12 and about one-half of the stress measuring device 14 being attached along the length of the other side of the center wire 12. The number of stress measuring devices 14 which may be attached along the length of the center wire 12 will generally range from about 2 to 1,000, will preferably range from about 3 to about 100, and will more preferably range from about 4 to about 25, with about 10 to about 15 being most preferred. The stress measuring devices 14 attached to the center wire 12 can be used to measure axial loads and bending loads (bending movements) due to strain differentials. It is preferable that the stress measuring devices 14 be spaced along the length of the center wire 12 with from about 6 to about 60 inches of space between each of the stress measuring devices 14, according to the particular application, such as equally spaced apart. However, other arrangements of the stress measuring devices 12 along the length of the center wire 12 may also be use. It is also preferable that, for each stress measuring device 14 present on one side of the center wire 12, there is also a corresponding stress measuring device 14 present directly across from the stress measuring device 14 on the other side of the center wire 12, such that one half of the stress measuring devices 14 are present on one side of the center wire 12 and one half of the stress measuring devices 14 are present on the other side of the center wire 12.

As used herein, the phrase "stress measuring device" means a device which measures the amount of stress, strain and/or tension load developed along a cable (or similar device) placed into a structure which may be, or become, unstable, which is small enough to permit forming material and noncenter wires to be wound around it, which can be spun into a rock mass without being damaged, and still work properly (i.e., which need not be hand-laid into a rock mass), and which can be used with concrete- or cement-based grout and/or resin-based grout. These devices include wire or other strain gages made from various metals and alloys, and from cast polymide, glass epoxy, or phenolic or laminated polymide. Such devices do not include potentiometers, which cannot be spun into a rock mass without being significantly damaged or destroyed, and/or optical fiber sensors, which are too large and bulky to have forming material and noncenter wires around them. Unlike with most of the known devices for measuring stress in an unstable structure, the stress measuring devices 14 employed in the apparatus 10 of the invention are located inside of the apparatus and are internal components of the apparatus. They can be installed into a rock mass or other structure without being damaged, and without needing any modifications in resin grouts, for example, by spinning them with a roof bolting machine using cement-based grouts.

The stress measuring device 14 may be attached to the center wire 12 be any of several methods known in the art, such as by adhering them thereto with an epoxy resin adhesive or a ceramic cement. The stress measuring devices 14 measure the stress, strain or tension developed along the length of the apparatus 10 when present in an unstable structure, such as the roof of a coal or other mine, to determine whether or not the apparatus 10 is being subjected to mining (or other) induced stress changes, for example, due to drilling operations. These stress measuring devices 14 measure the displacement of the apparatus 10 in the unstable structure caused by the stretch of the apparatus 10 which, in turn, is caused by a load being placed upon the apparatus 10.

One stress measuring device 14 which may be employed in the apparatus 10 of the invention is a strain gauge, which is described in Froden, "Modern Instrumentation and Measurements in Physics & Engineering." *AIP Handbook of Modern Sensors; Physics, Designs and Applications* (American Institute of Physics, New York, 1993), and which is commerically available. A strain gauge is a resistive elastic sensor whose resistance R is a function of applied strain (unit deformation). Because materials resist deformation, force must be applied to cause deformation. Hence, resistance R can be related to applied force. That relationship is generally called the piezoresistive effect, and is expressed through the gauge factor $S_e$ of the conductor as follows:

$$\frac{dR}{R} = S_e e,$$

wherein dR is change in resistance and e is measured strain. For many materials, $S_e \approx 2$. For platinum, $S_e \approx 6$ and, as is indicated hereinbelow, for platinum alloys. $S_e \approx 4.0-6.0$. For silicon, $S_e \approx -100$ to +150. In the experiments described in the Example, the gauge factor employed was 2.095. For small variations in resistance not exceeding about 2% (which is usually the case), the resistance R of a metallic wire is:

$$R=R_o(1+x)$$

where $R_o$ is the resistance with no stress applied and $x=S_e e$. For semiconductive materials, the relationship depends on the doping concentration. Resistance decreases with compression and increases with tension. Characteristics of some resistance strain gauge are given in Table 1:

TABLE 1

| Material | gauge factor. $S_e$ | resistance $\Omega$ | Temperature Coefficients of Resistivity, TCR(° C.$^{-1}$ · 10$^{-6}$) | Notes |
| --- | --- | --- | --- | --- |
| 57% Cu–43% Ni | 2.0 | 100 | 10.8 | $S_e$ is constant over a wide range of strain. For use under 260° C. |
| Platinum alloys | 4.0–6.0 | 50 | 2160 | For high temperature use. |
| Silicon | –100 to +150 | 200 | 90,000 | High sensitivity, good for large strain measurements. |

Figure 4:
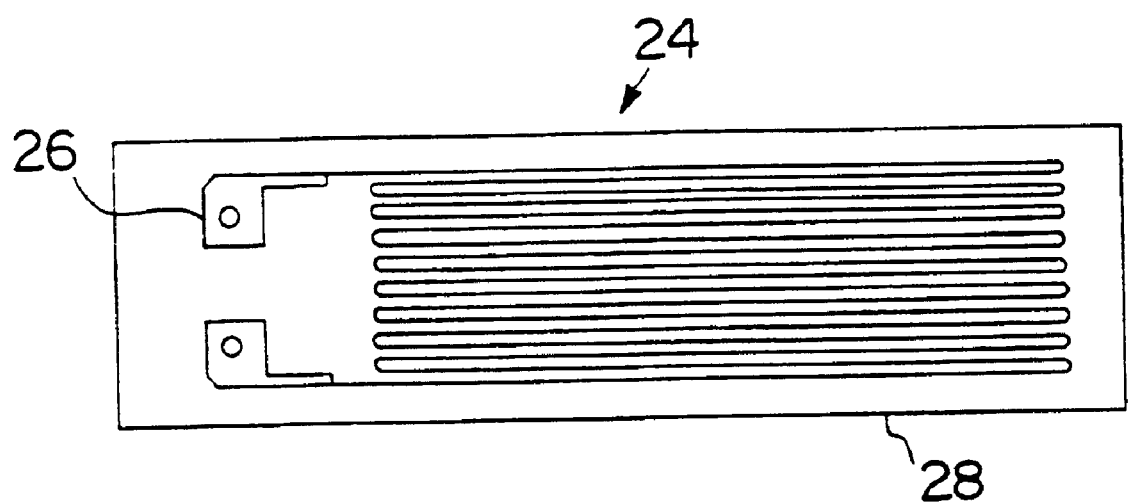
FIG. 4 shows a wire strain gauge, having a resistor bonded with an elastic backing, for mounting on the center or kingwire.

A wire strain gauge, which is illustrated in FIG. 4, is composed of a resistor 26 bonded with an elastic carrier (backing 28). The backing 28, in turn, is applied to the object where stress or force should be measured (i.e., the center wire 12 in the apparatus 10 of the present invention). Many metals can be used to fabricate strain gauges, and include the alloys constantan, nichrome, advance and karma.

The stress measuring devices 14 are connected with, and send data to, a device for collecting data 20 by the stress measuring devices 14, preferably by a connecting device 22, which connects each of the stress measuring devices 14 with the device for collecting data 20. The connecting device 22 may, for example, be attached to the stress measuring device 14 using AWG30 wire, with two leads being attached to each stress measuring device 14. The connecting device 22 is generally connected with the stress measuring devices 14 at a point in the assembly of the apparatus 10 of the invention prior to placing a forming material 16 around the center wire 12 and stress measuring devices 14, such as prior to attaching the stress measuring devices 14 to the center wire 12.

The stress measuring devices 14 provide a readout of how the apparatus 10 is stretching, and displacements are recorded.

A 12-pin cannon plug, for example, may be employed to connect the stress measuring devices 14 to the device for collecting data 20. The 12-pin cannon plug preferably has multiple wires attached to it, with two of these wires being attached to each stress measuring device 14 (one attached to each side of the device 14), and with all of the wires being attached to the device for collecting data 20. The 12-pin cannon plug may be connected to a multiplexor, which sends voltage through the stress measuring devices 14 at a predetermined rate. The amount of voltage which may be sent generally ranges from about 15 to about 5000 millivolts, and preferably ranges from about 15 to about 50 millivolts. The predetermined rate generally ranges from about 5 to about 5000 millivolts, and preferably ranges from about 15 to about 5000 millivolts. The voltage sent through the stress measuring devices 14 decreases as the apparatus 10 is stretched, which occurs when a load is placed thereon. The raw voltage data (voltage differential or microstrain voltage) is correlated with the amount of load being placed upon the apparatus 10 by, for example, balancing a 350 Ω Wheatstone bridge thereon.

Other devices which may be used to connect the stress measuring devices 14 with the devices for collecting data 20 include Micro Measurements P3500, Campbell Scientific 21X, Omnidata-datalogger (Campbell Scientific, Inc., Logan, Utah); other computer-based data collection devices may, of course, be used if desired.

The device for collecting data 20 may be any device which holds the measurement value for viewing. For example, a datalogger system which may be connected to the stress measuring devices 14, and which reads and stores the data, is commercially available from Campbell Scientific, Inc.

The resulting center wire 12 having a plurality of stress measuring devices 14 attached along the length thereof, is then formed into an "instrumented king wire" by placing a forming material 16 generally around the entire length of the resulting cable, so that the center wire 12 and stress measuring devices 14 are preferably completely encased within the forming material 16. Any forming material 16, such as epoxy or two-part liquid or other plastic mixes, may be used to form the instrumented kingwire, with 1838 B epoxy being preferred.

A variety of different methods may be used to form the forming material 16 around the center wire 12 having a plurality of stress measuring devices 14 attached along the length thereof. For example, the center wire 12 having the stress measuring devices 14 attached thereto may be placed into an injection mold, and then the forming material 16, such as epoxy, may be injected into the mold, along the entire length of the instrumented kingwire, thereby enclosing the center wire 12 and stress measuring devices 14 partially or completely within the forming material 16. It is preferred that the center wire 12 and stress measuring devices 14 be completely enclosed within the forming material 16.

The resulting epoxied or otherwise formed center wire 12 (instrumented kingwire) is then wrapped with a plurality of noncenter wires 18, such as steel wire ropes or steel stranded cables, preferably along the entire length thereof, and one at a time, by standard methods to strengthen the epoxied instrumented kingwire and render the cable usable for ground or other support, and for stress measurement. For example, each noncenter wire 18 may be hand or machine wrapped around the formed center wire 12, one at a time or more than one at a time.

The noncenter wires 18 may be the same or different, and may be any material which, in conjunction with the epoxied instrumented kingwire, is durable enough to withstand the loads which may be placed thereon when present within an unstable structure. For example, the noncenter wires 18 may be made from various types of metals, such as steel, with grade 270 K low relaxation steel being preferred. The noncenter wires 18 will generally have a length width ranges from about 25 inches to about 12,000 feet, and preferably ranges from about 33 inches to about 64 feet, with about 32 feet being preferred. Because the noncenter wires 18 are wrapped around the length of the epoxied instrumented kingwire, their length will generally be longer than the length of the center wire 12. The diameter of the noncenter wires 18 generally ranges from about 0.10 to about 0.75 inches, and preferably ranges from about 0.198 to about 0.202 inches, and more preferably ranges from about 0.199 to about 0.201 inches.

The number of noncenter wires 18 which may be wrapped around the epoxied instrumented center wire 12 generally ranges from about 1 to about 10,000, preferably ranges from about 4 to about 1,000, and more preferably ranges from about 5 to about 20, with about 6, 7, or 8, and preferably 6, being most preferred.

The apparatus 10 of the invention will generally have a wedge coupling 30 or like structure placed around the noncenter wires 18 on one end, and a hex barrel 32 or like structure placed around the wedge coupling 30. The wedge coupling 30 and hex barrel 32 provide a structure on the outside of the apparatus 10 of the invention which may be gripped by a user when the assembly is being inserted into a rock mass or other unstable structure. The hex barrel 32 also functions to protect the 12-pin cannon plug (or similar device), and to provide a structure to be wrenched by an insertion tool when the apparatus 10 is being inserted into an unstable structure.

All of the materials and equipment used to make the apparatus of the present invention are commercially available from sources known to those of skill in the art. The apparatus of the invention may be made generally by cutting a commercially-available center wire having the desired width and thickness with standard wire cutting tools to the desired length. A plurality of commerically-available stress measuring devices are then attached along the length of the center wire with, for example, an epoxy resin. Preferably, the stress measuring devices are spaced apart equally, with each stress measuring device having a corresponding stress measuring device present on the opposite side of the center wire. A forming material, such as epoxy, is then placed around the entire length of the center wire and attached stress measuring devices, for example, by standard injection molding techniques. The resulting instrumented formed kingwire is then wrapped along the length thereof with a plurality of commercially-available noncenter wires having a desired thickness, which have been cut to the desired length with standard wire cutting tools, preferably one at a time. Preferably, a wedge coupling 30 is placed around one end of the resulting instrumented cable, and a hex barrel is placed around the wedge coupling.

The resulting apparatus of the invention may then be quickly, easily and efficiently installed within an unstable structure, such as the roof of a mine, to provide support thereto, and to measure the stress present therein, and formed along the length of the apparatus, with a drill, a bolting machine, a spinning device, or by using other routine precedures known by those of skill in the art. The bolt head of the cable, which is formed by the wedge coupling 30 and hex barrel 32, may be used for the insertion and storage of the 12-pin cannon plug, and as a nut to turn the apparatus 10 once it is bonded into an unstable structure with grout. Avantageously, the apparatus need not be hand-laid into the structure, but may be spun into the structure by known methods.

For example, for use for support and strain measurement in a rock mass, an approximately 5-foot hole is drilled into the rock mass with routine equipment, and the apparatus is then spun into the hole (like a screw) by known methods, and embedded approximately 5-feet down in the rock mass (in a strained area of the rock mass) lengthwise. The apparatus is then cemented into the rock mass by known methods with one of the grouts described herein.

The apparatus of the invention advantageously may be bonded into a rock mass or other structure with a variety of different types of grouts, including cement-based grouts and resin-based grouts. Examples of cement-based grouts which may be used include Portland cement and Hydrastone. Examples of resin-based grouts which may be used include epoxy resin, Fasloc (DU PONT, Hurricane, W. Va.) and Fasroc (Celtite, Grand Junction, Colo.).

Preferably, the grouting will be "full-length grouting," with the entire apparatus being grouted into the rock mass or other structure to be supported. Generally, a hole which ranges from about 1 and 1/8 to about 1 and 3/8 of an inch in diameter, and ranges from about 5 to about 16 feet in depth, is drilled into a rock mass, and the apparatus is fed into this hole, and grouted therein in a desired position. Generally, only the head of the apparatus will protrude out of the rock mass. The apparatus functions similarly to a beam in a house to glue the rock mass together, and also to measure the strain developed along the length of the apparatus in the rock mass. Methods for the grouting of cables into a rock mass or other structure are well-known by those of ordinary skill in the art.

Although certain preferred embodiments of the apparatus of the present invention have been shown and described herein, those or ordinary skill in the art will recognize numerous variations, modifications and substitutions which may be made as by adding, combining, subdividing parts, or by substituting equivalents. Thus, the invention is not limited to the embodiments described herein.

All publications and patents cited throughout this document are hereby incorporated herein in their entireties by reference.

EXAMPLE

An instrumented cable was constructed and tested as described below. The instrumented cable had a steel kingwire measuring 60 inches in length and 0.20 inches in diameter, and had ten of the strain gauges shown in FIG. 4 (strain gauges numbers 1–10) attached along the length thereof with an epoxy resin, with five strain gages placed on opposite sides of the kingwire, and with each of the five strain gauges evenly spaced apart by about 8 inches. Each strain gauge had a corresponding strain gauge positioned at the same location on the kingwire, but on the opposite side of the kingwire, resulting in five sets of strain gauges formed from ten separate strain gauges. The resulting instrumented kingwire was attached to a 12-pin cannon plug which, in turn, was connected with a datalogger system for collecting data produced by the stress measuring devices. The instrumented kingwire was then placed into an injection mold, and epoxy (3M 1838 B epoxy) was injected into the mold along the entire length of the kingwire. The resulting epoxied kingwire was then wrapped with six steel cables (one at a time) measuring 60 inches in length and 0.60 inches in diameter by standard methods along the entire length thereof.

Figure 5:
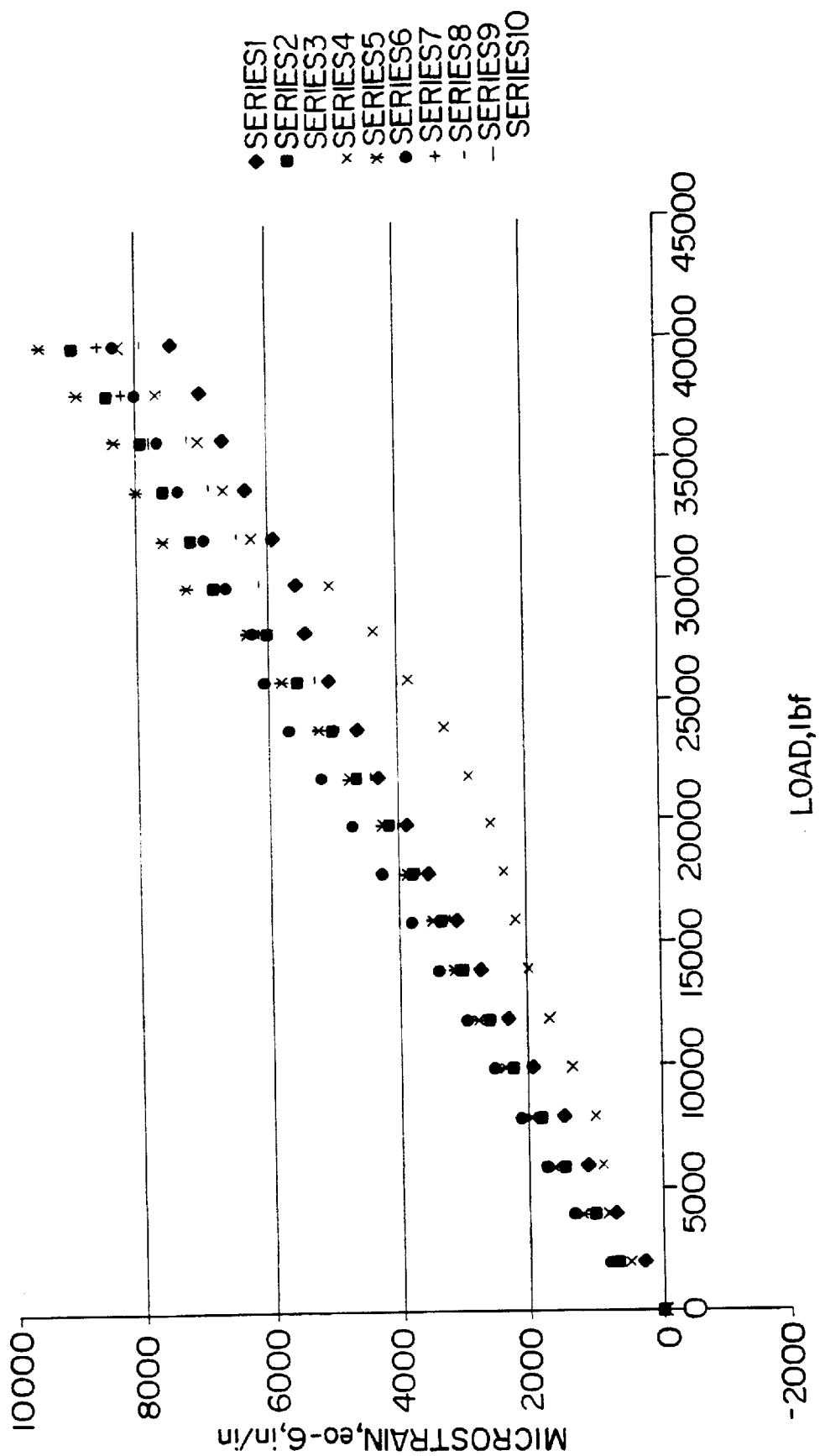
FIG. 5 is a graph showing calibration data resulting from the experiment described in the Example. Strand stress (from 0 to 35000 psi) on the horizontal axes is plotted versus microstrain (from −2000 to 10,000 microinches) on the vertical axis for the ten strain gauges described in the Example.

A series of calibration tests was performed on the resulting instrumented cable. The results of these calibration tests are shown graphically in FIGS. 5–8. These results show that the instrumented cable functioned properly to measure the strain (in microinches) present thereon at different levels of stress (in psi) or load (in lbf). Data representing momental strain was collected for each of the ten separate strain gauges (gauges 1–10 in FIGS. 5 and 7), and then the average between each of the five sets of the ten strain gauges (one on each side of the kingwire) was determined in order to show the true axial strain present on the instrumented cable (average sets 1–5 in FIGS. 6 and 8), rather than a momental strain. The calibration tests for the average sets of strain gauges were performed using the data collected from the following strain gauges:

| Average Set | Strain Gauges |
|---|---|
| 1 | 1 and 6 |
| 2 | 2 and 7 |
| 3 | 3 and 8 |
| 4 | 4 and 9 |
| 5 | 5 and 10 |

The following equations were employed to determine the load-stress-strain relationships:

$$\frac{\text{microstrain}}{\text{(microinches)}} = \frac{\text{length of cable (microinches)}}{\text{change in length of cable (microinches)}}$$

$$\frac{\text{strand stress}}{\text{(psi)}} = \frac{\text{load (pounds per foot)}}{\text{area of the cable (microinches)}}$$

Figure 6:
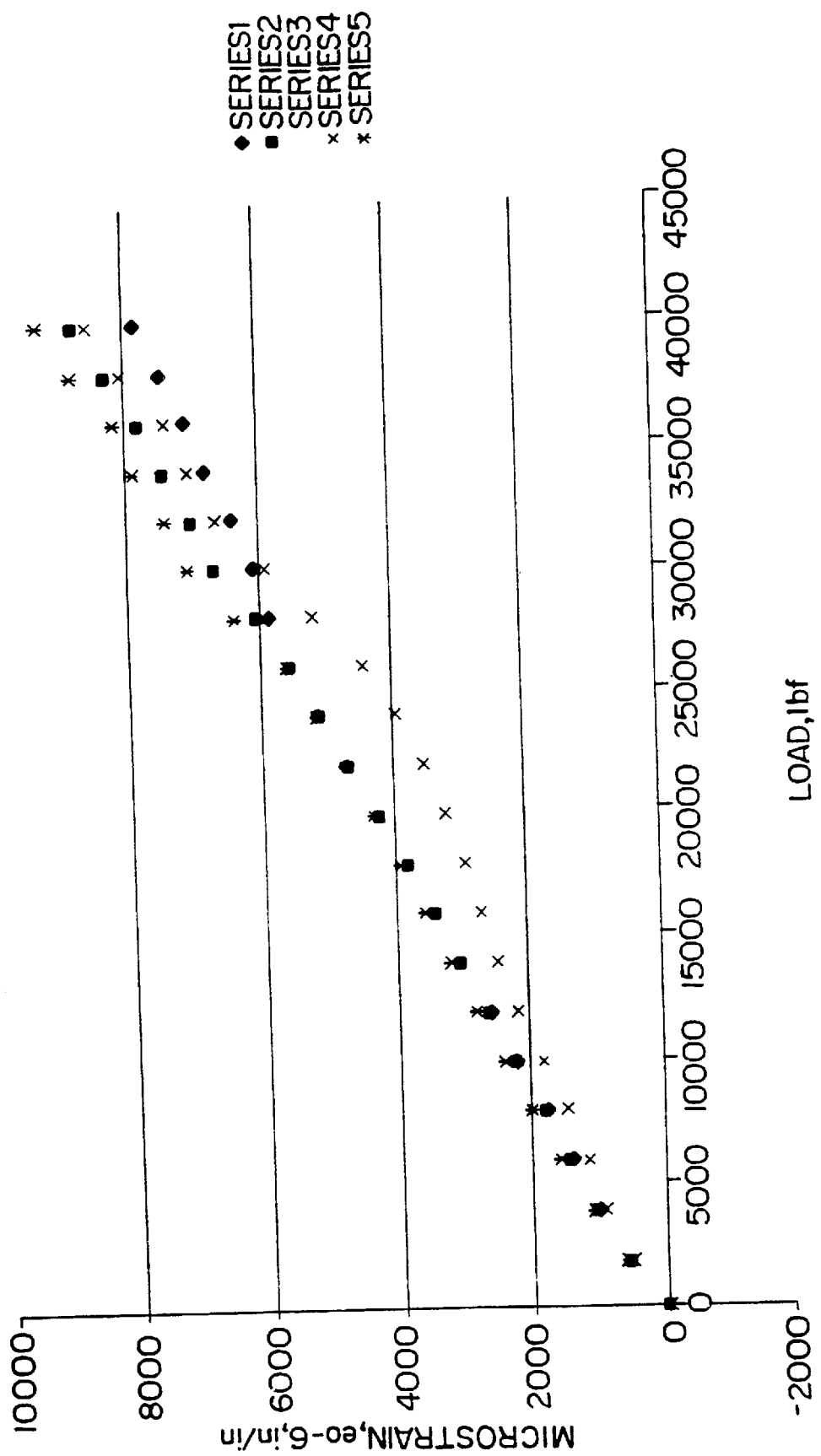
FIG. 6 is a graph showing calibration data resulting from the experiment described in the Example. Strand stress (from 0 to 35000 psi) on the horizontal axis is plotted versus microstrain (from −2000 to 10,000 microinches) on the vertical axis for the average sets of the five sets of two strain gauges described in the Example.
Figure 7:
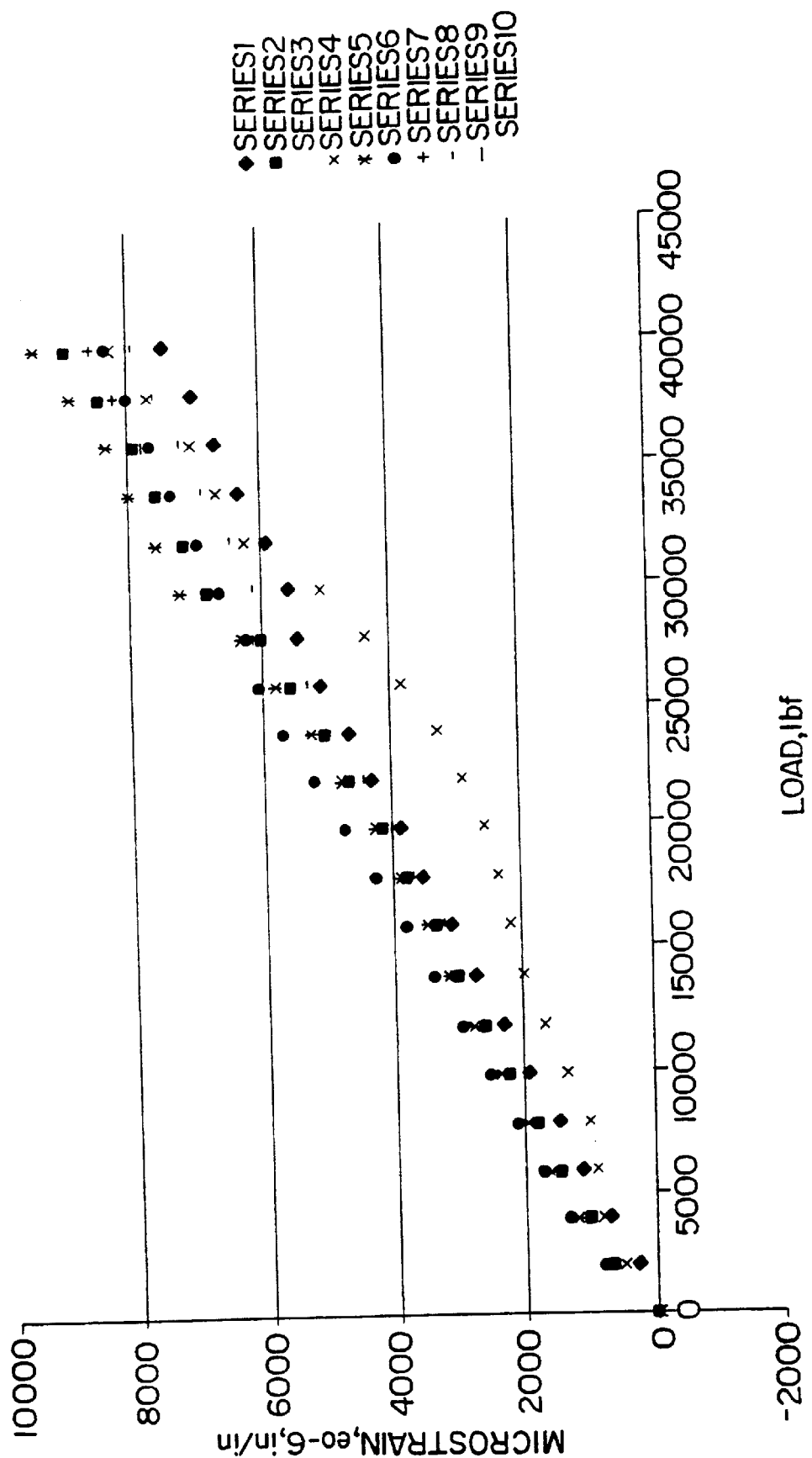
FIG. 7 is a graph showing calibration data resulting from the experiment described in the Example. Load (from 0 to 45000 lbf) placed upon the instrumented cable on the horizontal axis is plotted versus microstrain (from −2000 to 10,000 microinches) on the vertical axis for the ten strain gauges described in the Example. The symbols in FIG. 7 are the same as described above for FIG. 5.
Figure 8:
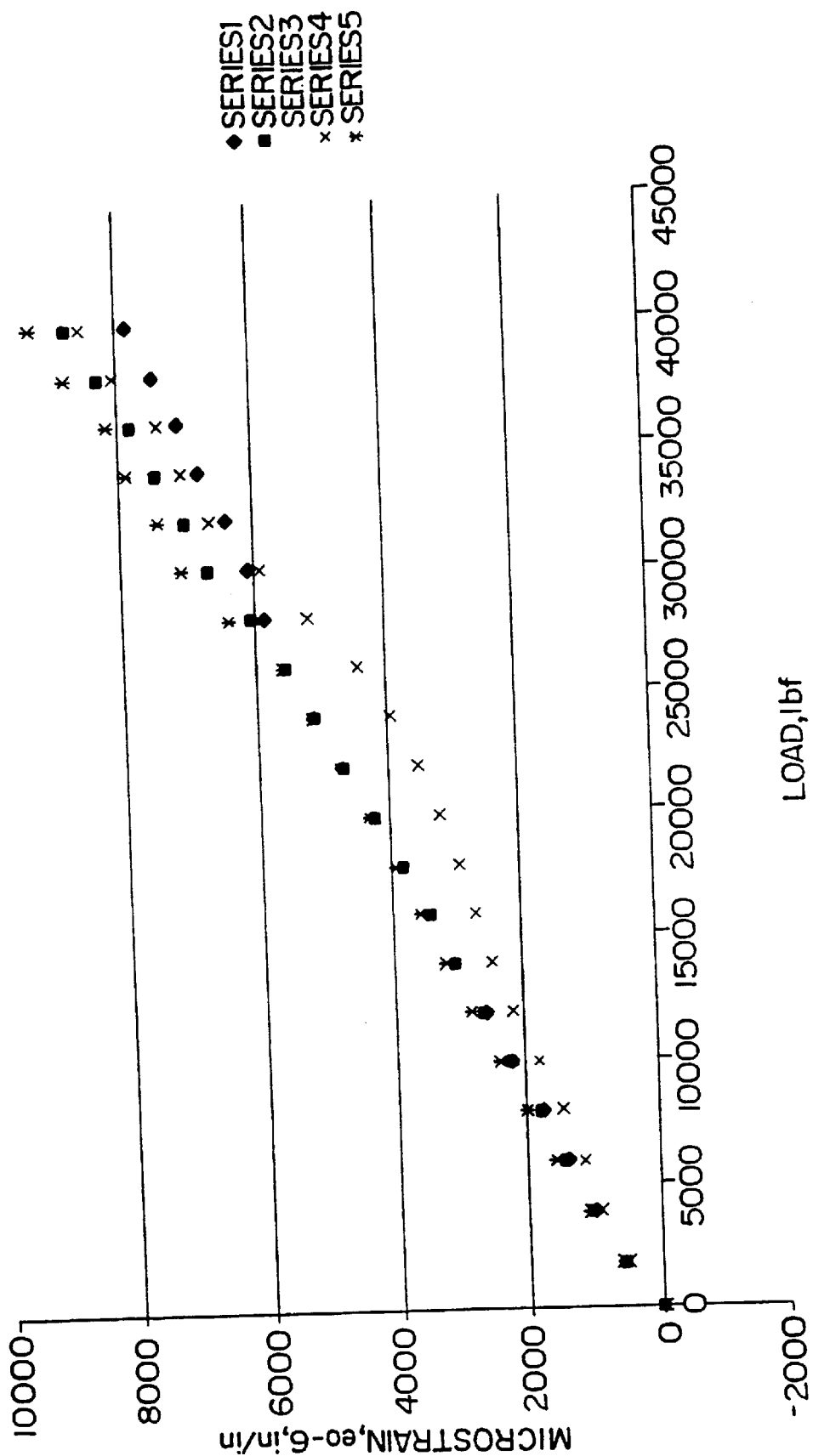
FIG. 8 is a graph showing calibration data resulting from the experiment described in the Example. Load (from 0 to 45000 lbf) placed upon the instrumented cable on the horizontal axis is plotted versus microstrain (from −2000 to 10,000 microinches) on the vertical axis for the average sets of the five sets of two strain gauges described in the Example. The symbols in FIG. 8 are the same as described above for FIG. 6.

The results of these calibration tests are shown in FIGS. 6 and 8.

What is claimed is:

1. An apparatus for providing support to a structure, and for measuring stress placed upon said apparatus when present in said structure, said apparatus comprising:
   (a) an elongate center wire having a length which is greater than its width;
   (b) a plurality of stress measuring devices, said stress measuring devices being attached along said length of said center wire for measuring stress present on said apparatus;
   (c) a forming material, said forming material being formed around said center wire and said stress measuring devices;
   (d) a plurality of noncenter wires, each noncenter wire having a length which is greater than its width, extending generally longitudinally of said center wire and being wound around the length of said center wire, said stress measuring devices, and said forming material; and
   (e) a device for collecting data produced by said stress measuring devices, said device being connected with said stress measuring devices;
   wherein the stress placed on said apparatus is measured at more than one location along the length of said apparatus, and wherein said apparatus is spinnable into a rock mass without damaging said stress measuring devices.

2. The apparatus of claim 1 wherein said apparatus is configured to be bonded to said structure with either concrete-based or resin-based grouts.

3. The apparatus of claim 1, wherein said apparatus has a diameter which ranges from about 0.4 to about 2 inches, and a length which ranges from about 1 to about 10,000 feet.

4. The apparatus of claim 1, wherein said center wire is made from steel.

5. The apparatus of claim 4, wherein said noncenter wires are made from steel.

6. The apparatus of claim 1, wherein from about 2 to about 1,000 of said stress measuring devices are attached to said center wire.

7. The apparatus of claim 1, wherein said forming material is epoxy.

8. The apparatus of claim 1, wherein from about 1 to 10,000 of said noncenter wires are wound around said center wire, said stress measuring devices and said forming material.

9. The apparatus of claim 8, wherein the diameter of said apparatus ranges from about 0.598 to about 0.602 inches, and the length of said apparatus ranges from about 3 to about 1,000 feet.

10. The apparatus of claim 1, wherein from about 4 to about 1,000 of said noncenter wires are wound around said center wire, said stress measuring devices, and said forming material.

11. The apparatus of claim 10, wherein from about 3 to about 100 of said stress measuring devices are attached to said center wire.

12. The apparatus of claim 11, wherein the length of said apparatus ranges from about 5 to about 100 feet.

13. The apparatus of claim 1, wherein from about 5 to about 20 of said noncenter wires are wound around said center wire, said stress measuring devices, and said forming material.

14. The apparatus of claim 1, wherein said center wire is made of type 1020 cold roll steel.

15. The apparatus of claim 14, wherein said noncenter wires are made from grade 270K low relaxation steel.

16. The apparatus of claim 1, wherein said stress measuring devices are strain gauges.

17. The apparatus of claim 1, wherein said forming material is 1838 B epoxy.

18. The apparatus of claim 17, wherein said noncenter wires are steel wire ropes or steel stranded cables.

19. The apparatus of claim 18, wherein from about 4 to about 25 of said stress measuring devices are attached to said center wire.

20. The apparatus of claim 19, wherein said stress measuring devices are attached to said center wire with an epoxy resin adhesive.

21. The apparatus of claim 20, wherein from about 6 to about 8 of said noncenter wires are wrapped around said center wire, said stress measuring devices, and said forming material.

22. The apparatus of claim 1, wherein about one half of said stress measuring devices are about equally spaced apart from each other on one side of said center wire, and about the other one half of said stress measuring devices are about equally spaced apart from each other on the other side of said center wire.

23. The apparatus of claim 1, wherein said stress measuring devices are connected with said device for collecting data by a connecting device.

24. The apparatus of claim 23, wherein said connecting device is a 12-pin cannon plug attached to a multiplexor, and wherein said multiplexor sends voltage through said stress measuring devices at a predetermined rate.

25. The apparatus of claim 24, wherein said device for collecting data is a datalogger system.

26. The apparatus of claim 23 wherein said stress measuring devices are wire strain gauges.

27. The apparatus of claim 26, wherein the length of said apparatus is about 16 feet.

28. The apparatus of claim 27, wherein about 6 of said noncenter wires are wound around said center wire, said stress measuring devices and said forming material.

29. The apparatus of claim 28, wherein said voltage ranges from about 15 to about 5000 millivolts.

30. The apparatus of claim 2, wherein said grouts are Portland Cement, epoxy resin, Fasloc or Fasroc.

31. The apparatus of claim 1, which additionally comprises a wedge coupling placed around one end of the apparatus, and a hex barrel placed around the wedge coupling.

32. A method of supporting a structure and measuring strain within said structure, said method comprising:
  (1) drilling a hole in said structure;
  (2) placing an apparatus within said hole; and
  (3) bonding said apparatus within said hole to said structure; wherein said apparatus comprises:
    (a) an elongate center wire having a length which is greater than its width;
    (b) a plurality of stress measuring devices, said stress measuring devices being attached along the length of said center wire for measuring stress present on said apparatus;
    (c) a forming material, said forming material being formed around said center wire and said stress measuring devices;
    (d) a plurality of elongate noncenter wires, each noncenter wire having a length width is greater than its width, extending generally longitudinally of said center wire and being wound around the length of said center wire, said stress measuring devices, and said forming material; and
    (e) a device for collecting data produced by said stress measuring devices, said device being connected with said stress measuring devices;
    wherein the stress placed on said apparatus is measured at more than one location along the length of said apparatus, and wherein said apparatus is spinnable into a rock mass without damaging said stress measuring devices.

33. The apparatus of claim 1, wherein said center wire has a first substantially flat side and said stress measuring devices comprise strain gages secured to said first flat side.

34. The apparatus of claim 33, wherein said center wire has a second substantially flat side and said strain gauges are secured to each of said flat sides.

35. The apparatus of claim 34, wherein said forming material comprises two forming members disposed on opposite sides of said center wire, each having a substantially flat surface facing said center wire, with the center and the plurality of stress measuring devices being sandwiched between the two forming members.

36. The apparatus of claim 35, wherein each of the two forming members has a substantially semi-cylindrical configuration.

37. The apparatus of claim 1 further including a wedge coupling covering an end of the noncenter wires, the wedge coupling aiding in grasping the apparatus.

* * * * *

UNITED STATES PATENT AND TRADEMARK OFFICE
CERTIFICATE OF CORRECTION

PATENT NO.    : 6,311,564 B1                                        Page 1 of 1
DATED         : November 6, 2001
INVENTOR(S)   : Martin et al.

It is certified that error appears in the above-identified patent and that said Letters Patent is hereby corrected as shown below:

Column 1,
Line 23, "10" should be -- 15 --.

Column 2,
Line 40, "win" should be -- wind --.

Column 5,
Line 25, -- wound -- should be inserted after "wires 18" and before "around".

Column 6,
Line 18, "use" should be -- used --.
Line 53, "be" should be -- by --.

Column 7,
Line 56, -- produced -- should be inserted after "data 20" and before "by".
Line 60, "device" should be -- devices --.

Column 9,
Line 10, "width" should be -- which --.

Column 13,
Line 20, "of" should be -- for --.

Signed and Sealed this

Second Day of July, 2002

*Attest:*

*Attesting Officer*

JAMES E. ROGAN
*Director of the United States Patent and Trademark Office*